(12) United States Patent
Takahashi

(10) Patent No.: US 11,110,724 B2
(45) Date of Patent: Sep. 7, 2021

(54) PRINTING APPARATUS

(71) Applicant: SCREEN HOLDINGS CO., LTD., Kyoto (JP)

(72) Inventor: Susumu Takahashi, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 16/525,025

(22) Filed: Jul. 29, 2019

(65) Prior Publication Data

US 2020/0086659 A1    Mar. 19, 2020

(30) Foreign Application Priority Data

Sep. 19, 2018   (JP) .............................. JP2018-174952

(51) Int. Cl.
| | |
|---|---|
| *B41J 3/60* | (2006.01) |
| *G06F 3/12* | (2006.01) |
| *B41J 11/00* | (2006.01) |
| *B41J 13/03* | (2006.01) |
| *B41J 13/00* | (2006.01) |
| *B41J 29/38* | (2006.01) |
| *B41J 11/46* | (2006.01) |

(52) U.S. Cl.
CPC .............. *B41J 3/60* (2013.01); *B41J 11/008* (2013.01); *B41J 11/0095* (2013.01); *B41J 11/46* (2013.01); *B41J 13/0027* (2013.01); *B41J 13/03* (2013.01); *B41J 29/38* (2013.01); *G06F 3/1208* (2013.01)

(58) Field of Classification Search
CPC ... B41J 3/60; B41J 11/008; B41J 11/46; B41J 13/03; B41J 11/0095; B41J 13/0027; B41J 29/38; G06F 3/1208; G06F 3/1282; G06F 3/1251; G06K 15/021; G06K 15/1868

See application file for complete search history.

(56) References Cited

U.S. PATENT DOCUMENTS 8,944,706 B2 *   2/2015   Sakamoto .................. B41J 3/60
                                                      400/188
2012/0020689 A1   1/2012   Inoue et al.

FOREIGN PATENT DOCUMENTS

| EP | 2 399 750 A1 | 12/2011 |
|---|---|---|
| JP | 2011-164619 A | 8/2011 |
| JP | 2012-240786 A | 12/2012 |

(Continued)

OTHER PUBLICATIONS

Extended European Search Report issued in corresponding European Patent Application No. 19188865.0-1017, dated Feb. 10, 2020.

*Primary Examiner* — Geoffrey S Mruk

(74) *Attorney, Agent, or Firm* — McDermott Will & Emery LLP

(57) ABSTRACT

A printing apparatus for printing on a front surface of a printing medium, and thereafter printing on a back surface of the printing medium. The apparatus includes the following elements: a front surface print head for printing a cue mark, and printing a front surface image based on front surface image data with reference to the cue mark; a back surface image data corrector for creating corrected back surface image data based on elasticity information in a transport direction after printing of the front surface image; a detector for detecting the cue mark; and a back surface print head for printing the corrected back surface image data on the back surface of the printing medium with reference to the cue mark detected by the detector.

13 Claims, 7 Drawing Sheets

(56) References Cited

FOREIGN PATENT DOCUMENTS

| | | |
|---|---|---|
| JP | 2014-144608 A | 8/2014 |
| JP | 2018-002314 A | 1/2018 |

\* cited by examiner

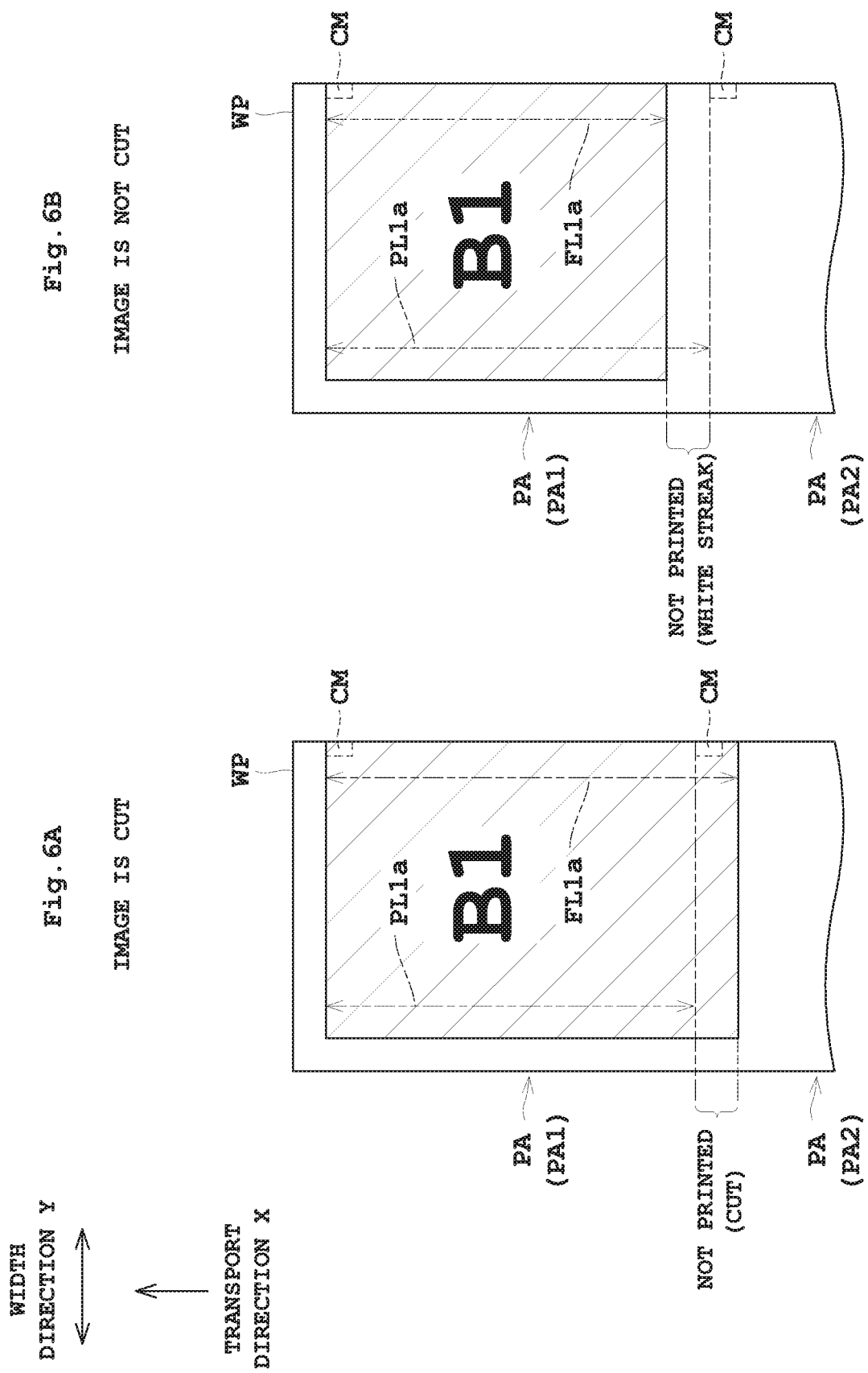

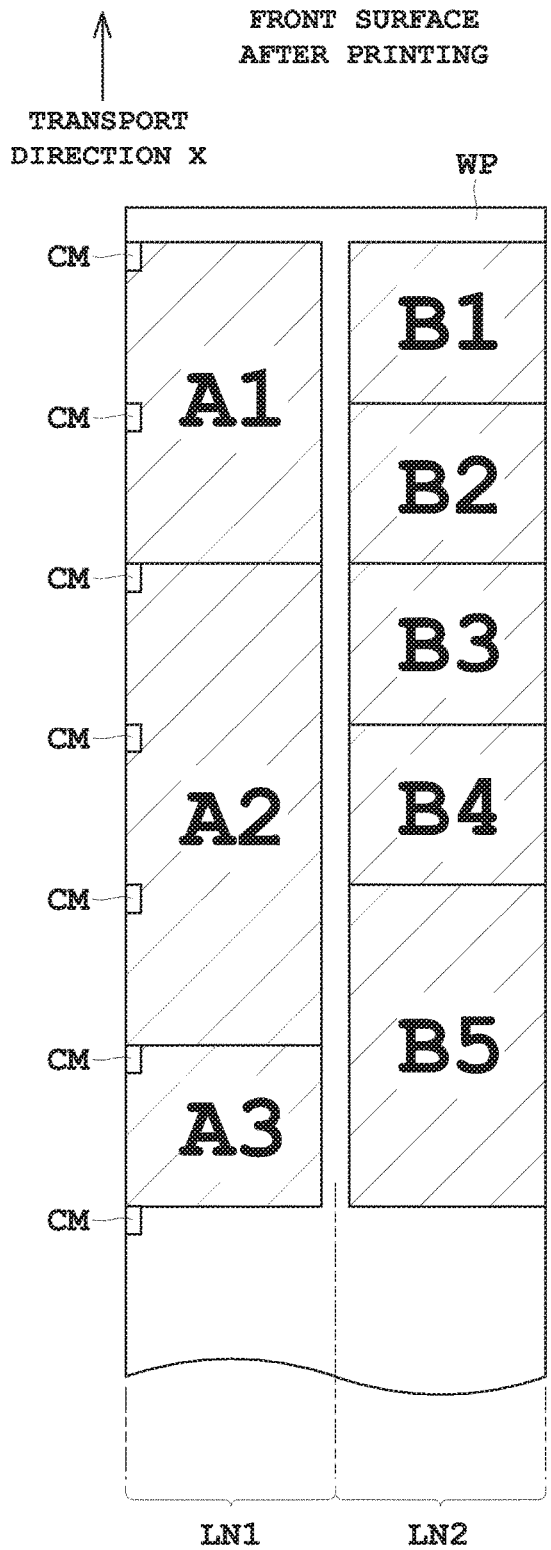
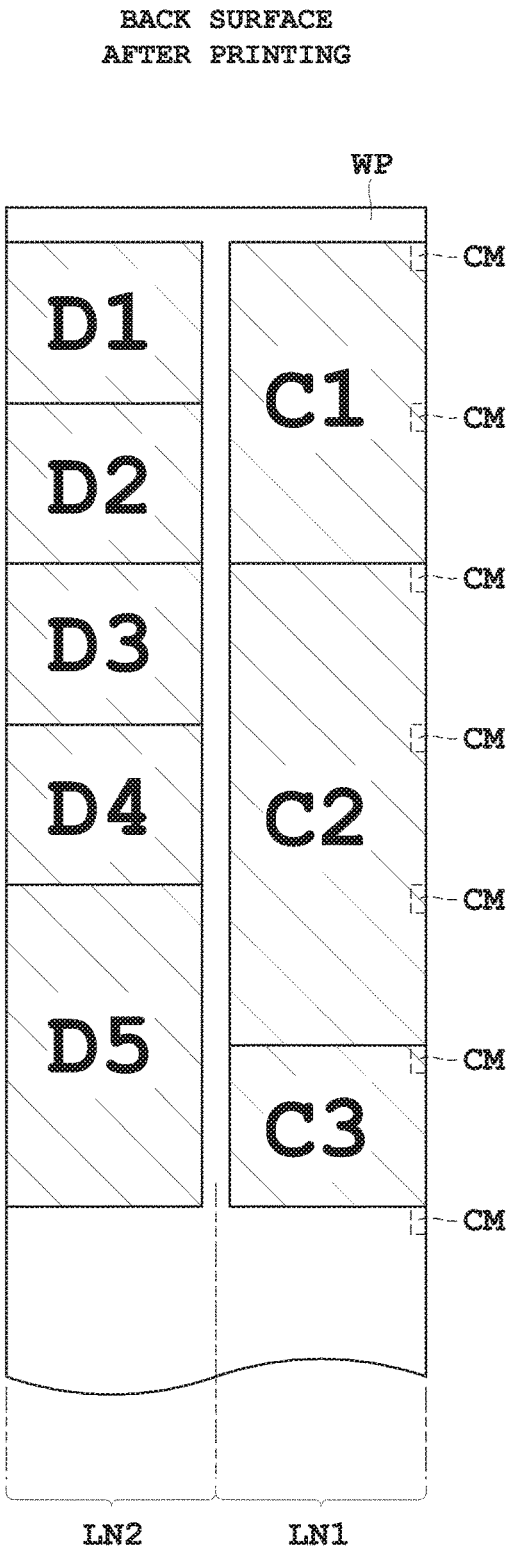

PRINTING APPARATUS

BACKGROUND OF THE INVENTION

(1) Field of the Invention

This invention relates to a printing apparatus for printing on the back surface after printing on the front surface of a printing medium, and more particularly to a technique of registering images on the back and front surfaces.

(2) Description of the Related Art

Conventionally, a known apparatus of this type includes a paper information acquiring unit, a front surface printing condition information acquiring unit, a register information creating unit, and a back surface printing unit (see Japanese Unexamined Patent Publication No. 2014-144608, for example). The paper information acquiring unit acquires paper information as information on printing paper. The front surface printing condition information acquiring unit acquires front surface printing condition information. The register information creating unit creates, based on the paper information and front surface printing condition information, register information in a width direction of the printing paper after images are printed on the front surface thereof. The back surface printing unit carries out a register correction using the register information at the time of back surface printing.

The above apparatus performs printing, taking into account an elongation or contraction in the width direction of the printing paper at the time of drying after the front surface printing. Any position shifting in the width direction between the prints on the back and front surfaces can be inhibited.

SUMMARY OF THE INVENTION

However, the conventional example with such construction has the following problems.

That is, the conventional apparatus can cope with the elongation and contraction in the width direction of the printing paper, but has a problem of failing to cope with an elongation or contraction in a transport direction of the printing paper.

Particularly where the printing paper is long web paper, tension is applied in the transport direction at the time of transportation, and the web paper tends to elongate or contract in the transport direction after front surface printing. When, for example, the web paper elongates after front surface printing, a length between cue marks which show the print start positions at the time of front surface printing will increase at the time of back surface printing. Then, when back surface printing is done with the same page length as at the time of front surface printing, a gap will occur in the form of a white streak between the pages. Such a white streak is about 0.1-0.2 mm, for example, but is very conspicuous, which poses a problem of lowering print quality.

Some conventional apparatus, taking an elongation of web paper in the transport direction, for example, carry out back surface printing based on elongated image data for printing on the back surface. Even with such conventional apparatus, however, the back surface printing is stopped by a page length of the web paper detected by a sensor of a back surface printing device. An elongated image on the back surface is therefore cut halfway. Consequently, there is a problem, as with the foregoing apparatus, that a white streak will appear on the back surface, lowering print quality.

This invention has been made having regard to the state of the art noted above, and its object is to provide a printing apparatus which can prevent lowering of print quality due to an elongation or contraction of a printing medium by correcting back surface image data based on elasticity information on the printing medium.

To fulfill the above object, this invention provides the following construction.

A printing apparatus for printing on a front surface of a printing medium, and thereafter printing on a back surface of the printing medium, according to this invention, comprises a front surface print head for printing, on the front surface of the printing medium transported in a predetermined transport direction, a cue mark indicating a printing start position in the transport direction of a front surface image, and printing the front surface image based on front surface image data with reference to the cue mark; a back surface image data corrector for creating corrected back surface image data by correcting an image size of back surface image data to be formed on the back surface of the printing medium, based on elasticity information in the transport direction after printing of the front surface image; a detector for detecting the cue mark printed on the front surface of the printing medium; and a back surface print head for printing the corrected back surface image data on the back surface of the printing medium with reference to the cue mark detected by the detector.

According to this invention, after the front surface print head prints on the front surface of the printing medium the front surface image based on the surface image print data, the back surface image data corrector creates corrected back surface image data from the image size of the back surface image data based on the elasticity information. The back surface print head prints the corrected back surface image data on the back surface of the printing medium with reference to the cue mark. Thus, the back surface printing is carried out reflecting an elongation or contraction in the transport direction of the printing medium occurring with the front surface printing. This can prevent lowering of printing quality due to an elongation or contraction of the printing medium.

In this invention, it is preferred that the apparatus further comprises an elasticity information memory for storing the elasticity information beforehand; wherein the back surface image data corrector changes the image size of the back surface image data in the transport direction using the elasticity information.

Test printing on the front and back surfaces is executed before printing products, and a degree of influence on the back surface printing due to an elongation or contraction accompanying the front surface printing is stored beforehand as elasticity information in the elasticity information memory. The back surface image data corrector can absorb the elongation or contraction accompanying the front surface printing by correcting the image size of the back surface image data using the elasticity information.

In this invention, it is preferred that the apparatus further comprises a page interval calculator for calculating as the elasticity information a page interval in the transport direction between cue marks detected by the detector; wherein the back surface image data corrector changes the image size of the back surface image data in the transport direction into agreement with the page interval.

The page interval calculator calculates the page interval between the cue marks as elasticity information, and the back surface image data corrector makes correction to bring the image size of the back surface image data into agreement with the page interval. This can absorb an elongation or contraction accompanying the front surface printing. Since an actual degree of elongation or contraction after the front surface printing on the printing medium is measured, the elongation or contraction can be absorbed with high accuracy even when changes occur in ambient environment or to printing conditions. Further, test printing is unnecessary, which can hold down the consumption of the printing medium not contributing to product printing.

In this invention, it is preferred that the apparatus further comprises a cut limiting value memory for storing beforehand a limiting value of any excess or deficiency occurring when printing is done based on the corrected back surface image data; a page interval calculator for calculating as the elasticity information a page interval in the transport direction between the cue marks detected by the detector; a cut amount arithmetic processor for calculating a difference between the page interval and the image size in the transport direction of the corrected back surface image data when printing is done based on the corrected back surface image data; and an error checker for determining that an error has occurred when the difference exceeds the limiting value.

The cut amount arithmetic processor calculates a difference between the page interval and the image size in the transport direction of the corrected back surface image data, and the error checker determines any such difference exceeding the limiting value to be an error. This allows it to be known that the accuracy of correcting the back surface image data has lowered under the influence of an environmental variation, a defect of the apparatus, or other situation.

In this invention, it is preferred that the apparatus further comprises an alarm for notifying the error when the error checker determines an occurrence of the error.

The notification given by the alarm of an error can prevent a continued printing carried out in a state of lowered accuracy of correcting the back surface image data.

In this invention, it is preferred that the front surface print head, when a plurality of print areas are set as lanes in a width direction perpendicular to the transport direction, prints the front surface image based on the front surface printing image data in each of the lanes; the back surface image data corrector creates the corrected back surface image data for each of the lanes; and the back surface print head prints the back surface image based on the back surface printing image data for each of the lanes.

Also when a plurality of lanes are set in the width direction of the printing medium and a different image is printed in each lane, the back surface image data corrector creates the corrected back surface image data for each lane. Thus, the printing with the plurality of lanes can also prevent lowering of printing quality due to elongation or contraction of the printing medium.

In this invention, it is preferred that the apparatus further comprises transport rollers for transporting the printing medium, and an image layout processor for setting a print area for printing the back surface image on the back surface of the printing medium based on the elasticity information; wherein the back surface print head starts printing based on the corrected back surface image data when, after the detector detects the cue mark, the transport rollers have transported the printing medium a distance corresponding to the interval between the printing start position for the back surface print head and a position for detecting the cue mark by the detector, and stops the printing based on the corrected back surface image data when the transport rollers have further transported the printing medium just a length corresponding to the print area.

The print area set to the back surface of the printing medium reflects the state of elongation or contraction of the printing medium after the front surface image printing. This applies also to the corrected back surface image data. Therefore, even when the printing medium is elongated or contracted by the front surface image printing, the interval in the transport direction between the back surface images can be made appropriate.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

FIGS. 2A-2C are schematic views showing an image printing process, in which FIG. 2A is a front surface before printing, FIG. 2B is a front surface after printing, and FIG. 2C is a back surface after printing;

FIGS. 6A and 6B are schematic views showing a state where a back surface image is not printed appropriately, in which FIG. 6A shows a case where an excess has occurred to the back surface image, and FIG. 6B shows a case where a deficiency has occurred to the back surface image; and FIGS. 7A and 7B are schematic views illustrating a case of setting a plurality of lanes, in which FIG. 7A shows a front surface, and FIG. 7B shows a back surface.

DESCRIPTION OF THE PREFERRED EMBODIMENTS

Preferred embodiments of this invention will be described in detail hereinafter with reference to the drawings.

Various embodiments of this invention will be described hereinafter.

Embodiment 1

Embodiment 1 of this invention will be described hereinafter with reference to the drawings.

Figure 1:
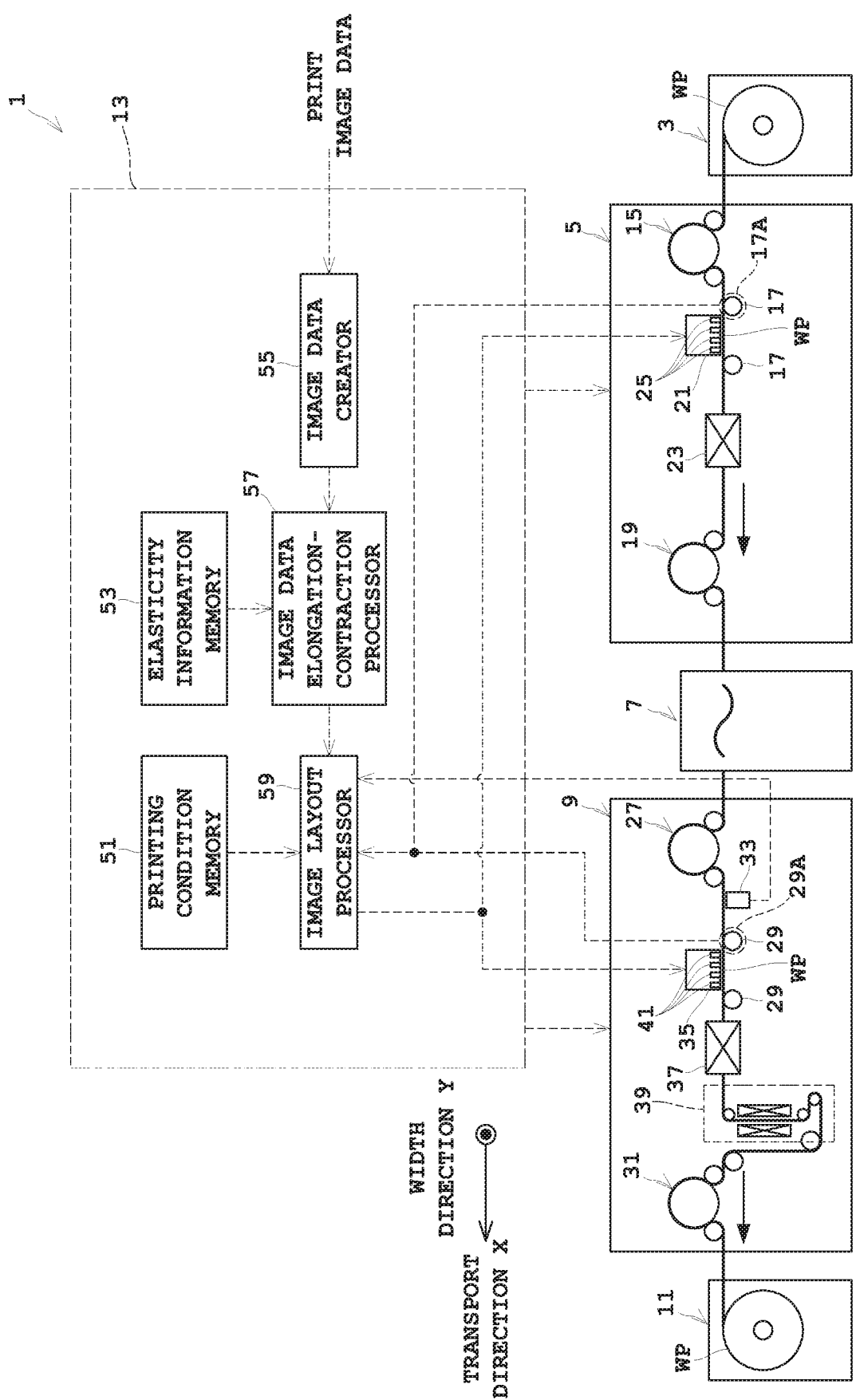
FIG. 1 is an outline view showing an entire inkjet printing apparatus according to Embodiment 1.

FIG. 1 is an outline view showing an entire inkjet printing apparatus according to Embodiment 1.

The inkjet printing apparatus according to this embodiment includes a paper feeder 3, a front surface printing unit 5, an inverting unit 7, a back surface printing unit 9, a takeup roller 11, and a printing control unit 13.

The paper feeder 3 holds a roll of web paper WP to be rotatable about a horizontal axis. The paper feeder 3 unwinds the web paper WP to feed it in a transport direction X to the front surface printing unit 5. The takeup roller 11 winds up into a roll form around a horizontal axis the web paper WP printed on the two surfaces thereof by the front surface printing unit 5 and back surface printing unit 9.

The web paper WP noted above corresponds to the "printing medium" in this invention.

The front surface printing unit 5 has a drive roller 15 located adjacent the paper feeder 3 for taking in the web paper WP from the paper feeder 3. The web paper WP unwound from the paper feeder 3 by the drive roller 15 is transported downstream along a plurality of transport rollers 17. The front surface printing unit 5 has a drive roller 19 in the most downstream position thereof. Between the drive roller 15 and drive roller 19, a printing station 21 and a drying unit 23 are arranged in order from upstream.

The printing station 21 has a print head 25. The print head 25 prints front surface images on the web paper WP by dispensing ink droplets on the front surface of web paper WP. The print head 25 performs flushing for eliminating non-dispensation of the print head 25, printing of testing charts, printing of images as products, printing of test images which are not products, printing of cue marks indicating print starting positions, and so on. The drying unit 23 carries out a drying process on the web paper WP printed at the printing station 21. The transport roller 17 located upstream of the print head 21 has an encoder 17A for detecting a rotational frequency of the transport roller 17. The encoder 17A outputs a pulse signal corresponding to a transported distance of the web paper WP.

The above printing station 21 corresponds to the "front surface print head" in this invention.

The inverting unit 7 includes a plurality of rollers not shown, and turns upside down the web paper WP fed from the drive roller 19 of the front surface printing unit 5. The inverting unit 7 feeds the inverted web paper WP to the back surface printing unit 9.

The back surface printing unit 9 has a drive roller 27 located adjacent the inverting unit 7 for taking in the web paper WP from the inverting unit 7. The web paper WP taken in by the drive roller 27 is transported downstream along a plurality of transport rollers 29. The back surface printing unit 9 has a drive roller 31 in the most downstream position thereof. Between the drive roller 27 and drive roller 31, a detector 33, a printing station 35, a drying unit 37, and a bifacial inspecting device 39 are arranged in order from upstream.

The detector 33 detects the cue marks indicating the printing start positions in the transport direction X of the front surface images printed by the print head 25 of the front surface printing unit 5. The printing station 35 has a print head 41. The print head 41 prints back surface images on the web paper WP by dispensing ink droplets on the back surface of web paper WP. The print head 41 performs flushing for eliminating non-dispensation of the print head 41, printing of testing charts, printing of images as products, printing of test images which are not products, and so on. The drying unit 37 carries out a drying process on the web paper WP printed at the printing station 35. The bifacial inspecting device 39 inspects the front surface images and back surface images printed at the printing stations 21 and 35. The transport roller 29 located upstream of the print head 41 has an encoder 29A for detecting a rotational frequency of the transport roller 29. The encoder 29A outputs a pulse signal corresponding to a distance the web paper WP is transported by the transport roller 29.

The above printing station 35 corresponds to the "back surface print head" in this invention.

The printing station 21 of the front surface printing unit 5 and the printing station 35 of the back surface printing unit 9 described above are capable, for example, of color printing using black (K), cyan (C), magenta (M), and yellow (Y), and special color printing with special color (e.g. gold) other than the above colors. Each of the print heads 25 and 41 has a plurality of nozzles arranged in a width direction Y of the web paper WP (depth direction from the plane of FIG. 1).

The above front surface printing unit 5 and back surface printing unit 9 are operable under overall control by the printing control unit 13. This printing control unit 13 includes a printing condition memory 51, an elasticity information memory 53, an image data creator 55, an image data elongation-contraction processor 57, and an image layout processor 59.

The printing condition memory 51 stores beforehand printing conditions such as specifications, e.g. a print area length and a width of the web paper WP, transporting speed, tension, and so on. The printing conditions are set beforehand by the operator of the apparatus through a keyboard not shown. The print area length of the web paper WP is set with reference to a length in the transport direction X of the front surface images printed on the front surface of the web paper WP. The elasticity information memory 53 stores beforehand elasticity information on elongation and contraction in the transport direction X of the web paper WP printed by the front surface printing unit 5. The elasticity information is set in numerical values such as $\frac{1}{100}$% or 0.1 mm, for example. This elasticity information is acquired by carrying out test printing not used for products, before printing products, and measuring degrees of influence on back surface printing caused by elongation and contraction of the web paper WP after front surface printing. Such degrees are set in the physical constants noted above. There are positives and negatives in these values. For example, the positives represent elongation of the web paper WP, and the negatives contraction of the web paper WP.

The image data creating section 55, for example, receives print image data including front surface image data and back surface image data from an external host computer, and creates front surface image data and back surface image data for processing by the front surface printing unit 5 and back surface printing unit 9. The image data elongation-contraction processor 57 performs an elongation-contraction process on the back surface image data based on the elasticity information in the elasticity information memory 53. On the other hand, the image data elongation-contraction processor 57 performs no process on the front surface image data. The elongation-contraction process on the back surface image data consists in multiplying the back surface image data in the transport direction X by a constant based on the elasticity information, thereby to create corrected back surface image data.

The image data elongation-contraction processor 57 corresponds to the "back surface image data corrector" in this invention.

The image layout processor 59 operates the printing station 21 based on the printing conditions from the printing condition memory 51, the front surface image data from the image data elongation-contraction processor 57, and the signal from the encoder 17A, to print the cue marks, and the front surface images corresponding to the front surface image data with reference to the cue marks on the front surface of the web paper WP. Further, the image layout processor 59 operates the printing station 35 based on the printing conditions from the printing condition memory 51, the corrected back surface image data from the image data elongation-contraction processor 57, the signal from the encoder 29A, and the signal from the detector 33, to print on the back surface of the web paper WP the back surface images corresponding to the corrected back surface image data with reference to the cue marks on the front surface.

Figure 2:
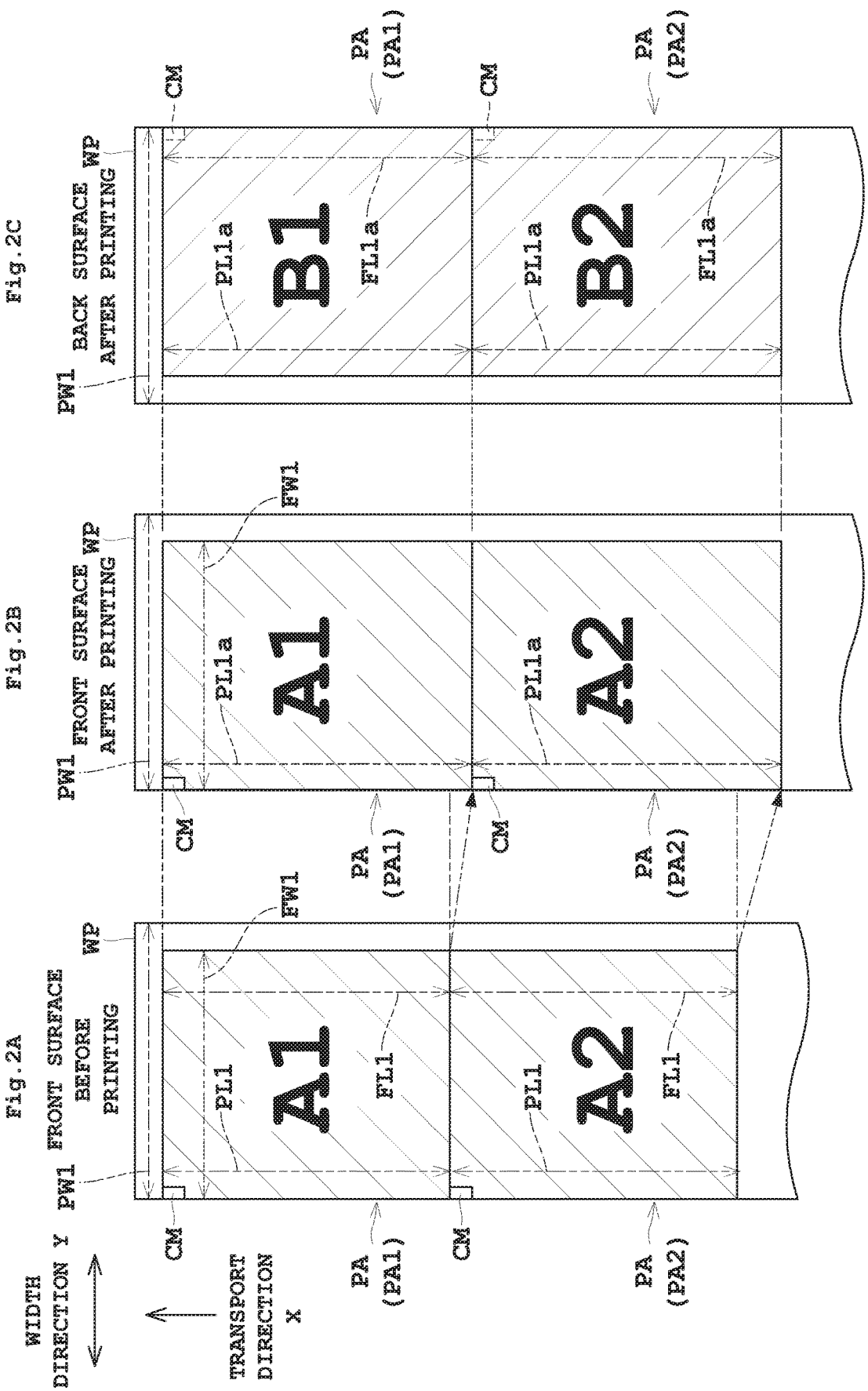

Next, a printing process accompanied by the above correction will be described in detail with reference to FIGS. 2A-2C. FIGS. 2A-2C are schematic views showing an image printing process, in which FIG. 2A is a front surface before printing, FIG. 2B is a front surface after printing, and FIG. 2C is a back surface after printing. It is assumed here that the web paper WP is elongated by front surface printing, and that elasticity information corresponding to the degree of elongation is stored in the elasticity information memory 53. The term "after printing" used here refers to after being printed at the printing station 21 and dried at the drying unit 23.

The front surface printing unit 5 operates under control of the printing control unit 13 to print a cue mark CM and a front surface image A1 based on the front surface image data on a first page PA1, of print pages PA on the front surface of the web paper WP, and a cue mark CM and a second front surface image A2 based on the front surface image data on a second page PA2. In this embodiment, various dimensions on the front surface before printing are assumed as shown in FIG. 2A, which include a paper width PW1 in the width direction Y of the web paper WP, a print area length PL1 in the transport direction X of each print page PA of the web paper WP, a front surface image data length FL1 in the transport direction X of each print page PA, and a front surface image data width FW1 in the width direction Y of each print page PA. In this case, the image layout processor 59 carries out a layout process on the front surface images A1 and A2 so that the front surface image data length FL1 be equal to the print area length PL1.

When the front surface print images A1 and A2 are printed, as shown in FIG. 2A, each of the dimensions after the printing will be as shown in FIG. 2B, for example. That is, the print area length PL1 in which each of the front surface print images A1 and A2 is printed increases to a print area length PL1a. Since the front surface print images A1 and A2 printed elongate with the web paper WP, the length of each of the front surface print images A1 and A2 becomes equal to the print area length PL1a.

Next, the image layout processor 59 prints back surface print images B1 and B2. Since the back surface image data of the back surface print images B1 and B2 are elongated by the elasticity information to become corrected back surface image data, the back surface print images B1 and B2, as shown in FIG. 2C, have a length in the transport direction X that is substantially equal to the print area length PL1a after the front surface image printing. At this time, the image layout processor 59 continues the printing process from detection of the cue mark CM by the detector 33 until the length of the web paper WP based on the signal from the encoder 29A becomes equal to the print area length PL1a after the printing. Thus, the printing process is not stopped at the print area length PL1 from the cue mark CM as is done conventionally.

Figure 3:
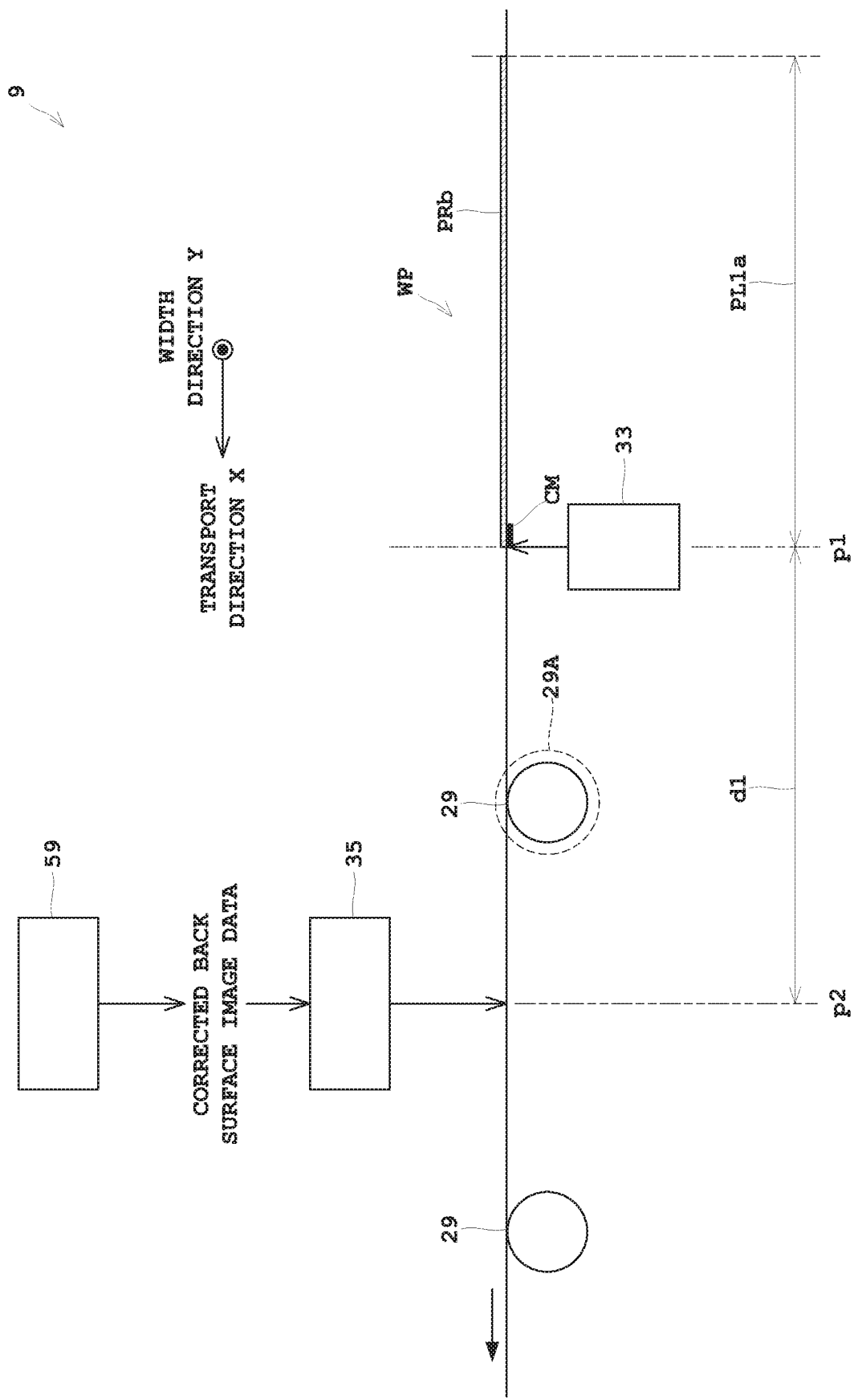
FIG. 3 is a schematic view illustrating back surface image printing in Embodiment 1.

The above process will be described more specifically using FIG. 3. FIG. 3 is a schematic view illustrating back surface image printing on the web paper WP by the back surface printing unit 9.

The web paper WP is, in the state of the front surface turned down, transported in the transport direction X by the transport rollers 29. The cue marks CM have been printed on the front surface of the web paper WP. The thickness of one cue mark CM is depicted as enlarged in FIG. 3. The detector 33 detects the cue mark CM in a detecting position indicated by sign p1. The printing station 35 is located downstream of the detector 33 in the transport direction X. Sign p2 indicates a printing start position where the printing station 35 starts printing on the web paper WP. Length d1 is assumed to be a length in the transport direction X between the detecting position p1 and printing start position p2. The image layout processor 59 sets a print area PRb to the back surface of the web paper WP for printing each back surface image upstream in the transport direction X of the cue mark CM. The length in the transport direction X of this print area PRb is a length which corresponds to the print area length PLa after the front surface image printing.

The image layout processor 59 detects from the pulse signal of the encoder 29A that the web paper WP is transported just the length d1 after the detector 33 detects the cue mark CM. Upon this detection, the image layout processor 59 starts feeding the corrected back surface image data to the printing station 35. The printing station 35 thereby starts printing the back surface image B1 (B2) on the back surface of the web paper WP. From the pulse signal of the encoder 29A, the image layout processor 59 detects that the web paper WP is transported further downstream just the length (i.e. the length that corresponds to the print area length PLa after printing) in the transport direction X of the print area PRb. Upon this detection, the image layout processor 59 stops feeding the corrected back surface image data to the printing station 35. The printing station 35 thereby stops printing the back surface image B1 (B2) on the back surface of the web paper WP.

The above process prints in the print area PRb the back surface image B1 (B2) having a length in the transport direction X that reflects the elongated state of the web paper WP after the front surface image printing. The print area PRb has a length in the transport direction X reflecting the elongated state of the web paper WP after the front surface image printing. This applies also to the corrected back surface image data. Consequently, even when an elongation or contraction occurs to the web paper WP, an interval in the transport direction X between the back surface images can be made appropriate. For example, it can prevent a gap from occurring in the form of a white streak between the back surface images.

According to the foregoing embodiment, after the printing station 21 prints on the front surface of the web paper WP the front surface images A1 and A2 based on the front surface image print data, the image data elongation-contraction processor 57 creates corrected back surface image data from the image size of the back surface image data based on the elasticity information. The printing station 35 prints the corrected back surface image data on the back surface of the web paper WP with reference to each cue mark CM. Thus, the back surface printing is carried out reflecting an elongation or contraction in the transport direction X of the web paper WP occurring with the front surface printing. This can prevent lowering of printing quality due to the elongation or contraction of the web paper WP.

Test printing on the front and back surfaces is executed before printing products, and a degree of influence on the back surface printing due to an elongation or contraction accompanying the front surface printing is stored beforehand as elasticity information in the elasticity information memory 53. The image data elongation-contraction processor 57 can absorb the elongation or contraction accompanying the front surface printing by correcting the image size of the back surface image data using the elasticity information.

Embodiment 2

Next, Embodiment 2 of this invention will be described with reference to the drawings.

Figure 4:
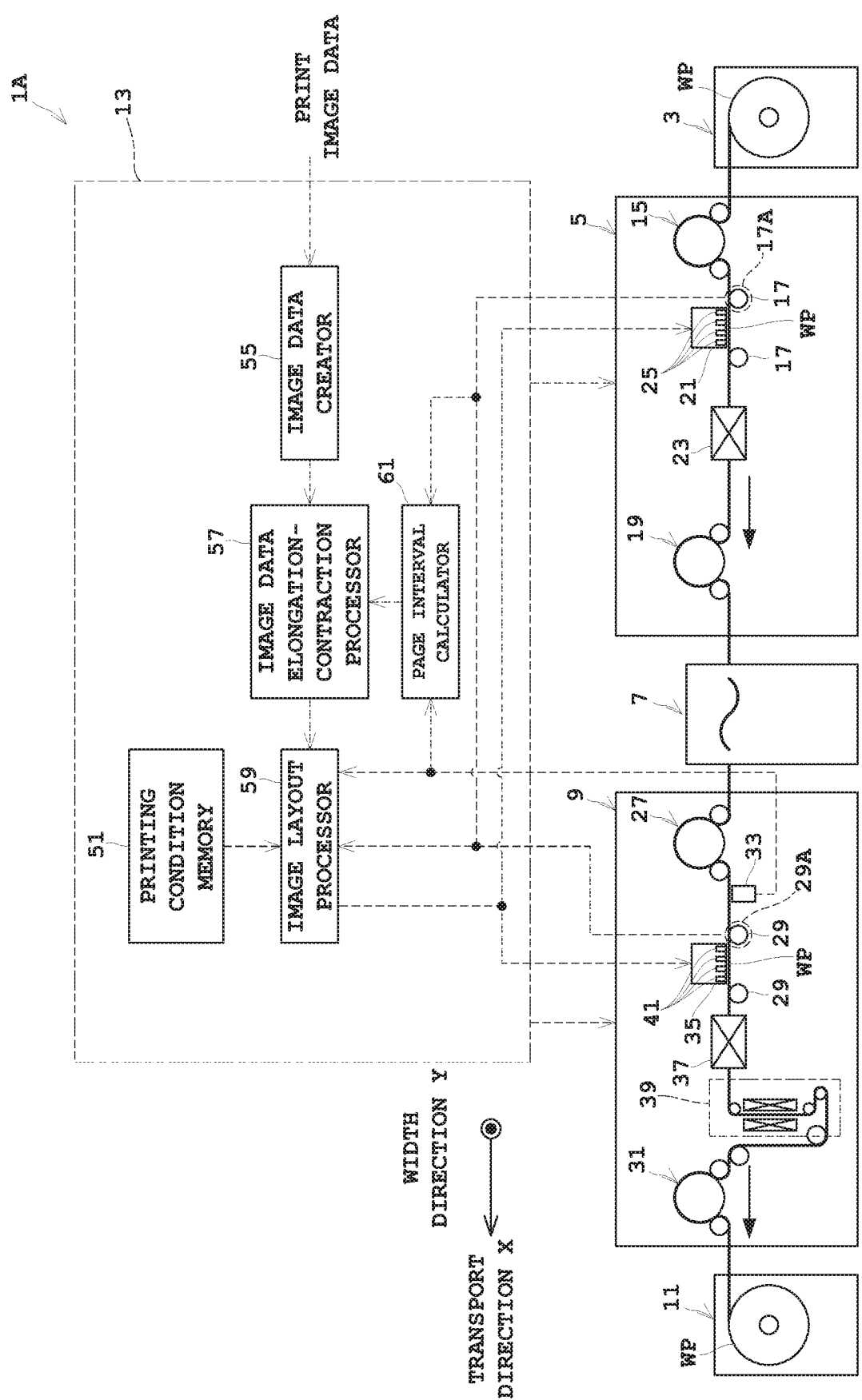
FIG. 4 is an outline view showing an entire inkjet printing apparatus according to Embodiment 2.

FIG. 4 is an outline view showing an entire inkjet printing apparatus according to Embodiment 2. Components having the same functions are shown with the same signs, and will not particularly be described.

This embodiment is different from foregoing Embodiment 1 in that the back surface printing unit 9 of an inkjet printing apparatus 1A has a page interval calculator 61.

The page interval calculator 61 calculates a length in the transport direction X between the cue mark CM and the next cue mark CM printed on the front surface of the web paper WP. That is, the page interval calculator 61 calculates an interval between the cue marks CM based on the signal from the encoder 29A representing a count from when the detector 33 detects the first cue mark CM until when the detector 33 detects the next cue mark CM. This interval becomes equal to the print area length $PL1a$ after the front surface printing in FIG. 2B.

The above interval between the cue marks CM corresponds to the "page interval" and to the "elasticity information" in this invention.

The image data elongation-contraction processor 57 creates back surface image data as corrected back surface image data based on the interval between the cue marks CM calculated by the page interval calculator 61 corresponding to the print area length $PL1a$ after the printing. Specifically, the image data elongation-contraction processor 57 creates the corrected back surface image data through a correction process to make the length in the transport direction X of the back surface image data correspond to the interval between the cue marks CM. The image layout processor 59 operates the printing station 35 to print the corrected back surface image data with reference to the cue marks CM printed on the front surface.

According to this embodiment, the page interval calculator 61 calculates the page interval between the cue marks CM as elasticity information, and the image data elongation-contraction processor 57 makes a correction to bring the image size of the back surface image data into agreement with the page interval. This can absorb an elongation or contraction accompanying the front surface printing. Since an actual elongation or contraction is measured, the elongation or contraction can be absorbed with high accuracy even when changes occur in ambient environment or to printing conditions. Further, test printing is unnecessary, which can hold down the consumption of the web paper WP not contributing to product printing.

Embodiment 3

Next, Embodiment 3 of this invention will be described with reference to the drawings.

Figure 5:
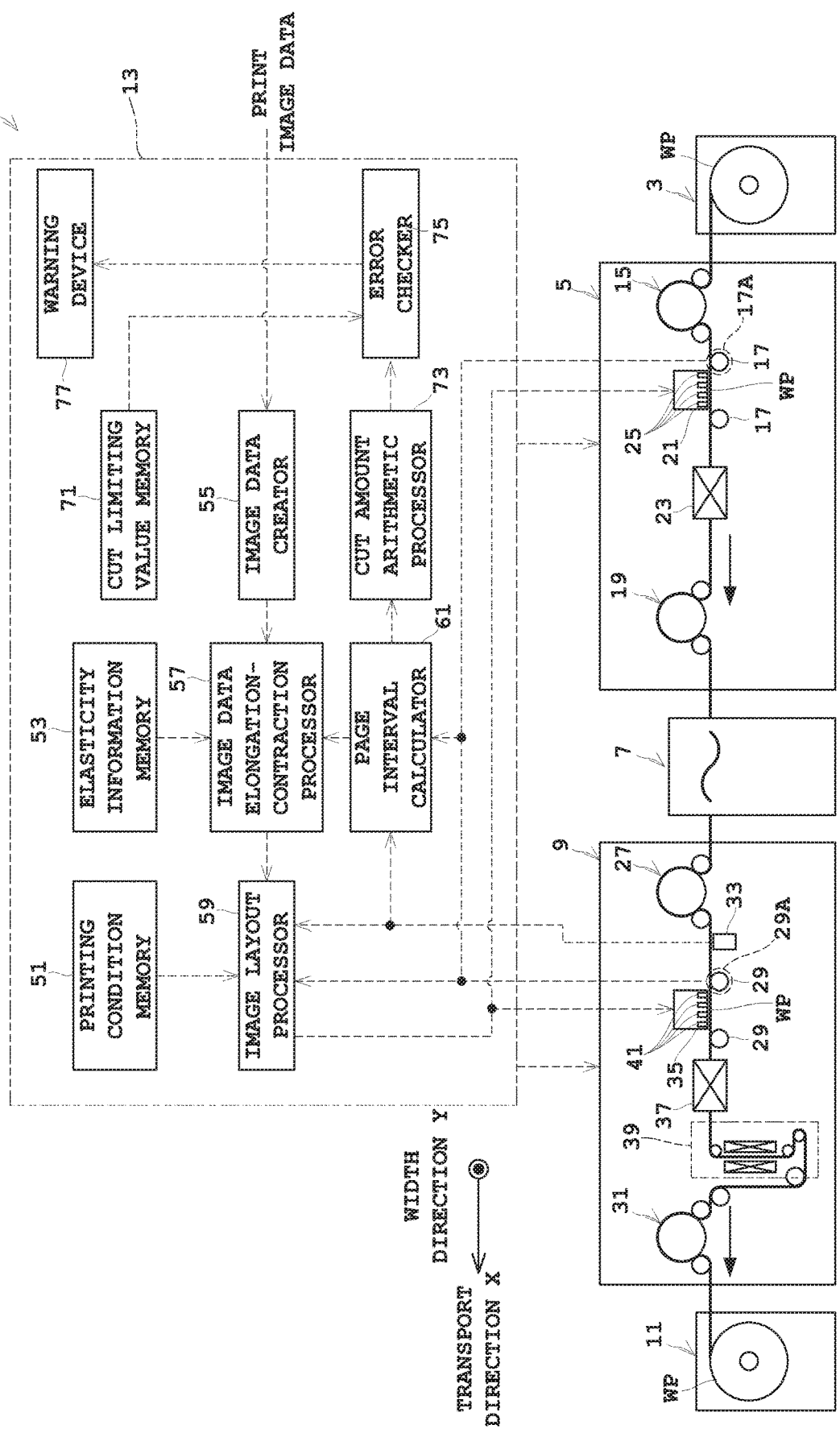
FIG. 5 is an outline view showing an entire inkjet printing apparatus according to Embodiment 3.

FIG. 5 is an outline view showing an entire inkjet printing apparatus according to Embodiment 3. Components having the same functions are shown with the same signs, and will not particularly be described.

This embodiment is different from foregoing Embodiment 1 in that the back surface printing unit 9 of an inkjet printing apparatus 1B has the page interval calculator 61, a cut limiting value memory 71, a cut amount arithmetic processor 73, an error checker 75, and an alarm 77.

The page interval calculator 61 has the same function as in foregoing Embodiment 2. The cut limiting value memory 71 stores beforehand a limiting value of any excess or deficiency occurring when printing is carried out based on the corrected back surface image data. The cut amount arithmetic processor 73 calculates a difference between the interval between the cue marks CM calculated by the page interval calculator 61 and the length $FL1a$ in the transport direction X of the corrected back surface image data occurring when the printing is carried out based on the corrected back surface image data. The error checker 75 determines presence or absence of an error from whether the difference exceeds a limiting value or not. When the error checker 75 determines that an error is present, the alarm 77 is operated to notify the occurrence of the error. The alarm 77 notifies the operator of the occurrence of the error by displaying the occurrence of the error, or giving a sound signal to that effect, for example.

According to this embodiment, the cut amount arithmetic processor 73 calculates a difference between the interval between the cue marks CM and the image size in the transport direction of the corrected back surface image data, and the error checker 75 determines any such difference exceeding the limiting value to be an error. This allows it to be known that the accuracy of correcting the back surface image data has lowered under the influence of an environmental variation, a defect of the apparatus, or other situation.

The notification given by the alarm 77 of an error can prevent a continued printing carried out in a state of lowered accuracy of correcting the back surface image data.

Not only the notification of an error, the elasticity information may also be updated automatically by feeding the difference from the cut amount arithmetic processor 73 back to the elasticity information in the elasticity information memory 53. Preferably, this is performed as follows.

Reference is now made to FIGS. 6A and 6B. FIGS. 6A and 6B are schematic views showing states where a back surface image is not printed appropriately, in which FIG. 6A shows a case where an excess has occurred to the back surface image, and FIG. 6B shows a case where a deficiency has occurred to the back surface image.

As shown in FIG. 6A, the length $FL1a$ of the back surface image B1 based on the corrected back surface image data is larger than the print area length $PL1a$ after printing of the front surface image A1. In this case, the back surface image B1 becomes excessive, and the portion including the cue mark CM of the second page PA2 and thereafter, corresponding to the difference, are cut without being printed. It is assumed here that the sign of the difference in the case of being cut is positive. As shown in FIG. 6B, the length $FL1a$ of the back surface image B1 based on the corrected back surface image data is less than the print area length $PL1a$ after printing of the front surface image A1. In this case, the back surface image B1 becomes deficient, and leaves a white streak, corresponding to the difference, where nothing is printed between the downstream end of the back surface image B1 and the cue mark CM of the second page PA2. It is assumed here that the sign of the difference in the case of being deficient is negative.

The elasticity information can constantly be given an appropriate value by updating the elasticity information with difference information consisting of the above signs and differences. Consequently, an appropriate printing of the back surface image can be maintained even with environmental variations or variations in the apparatus state.

This invention is not limited to the foregoing embodiments, but may be modified as follows:

(1) Each of foregoing Embodiments 1-3 has been described taking the web paper WP as an example of printing media. This invention is not limited to this printing medium. For example, this invention is applicable to other printing media such as film.

(2) Each of foregoing Embodiments 1-3 has been described taking for example the construction in which the front surface printing unit 5 has one printing station 21 and the back surface printing unit 9 has one printing station 35. This invention is not limited to such construction. For example, this invention is applicable also to a construction in which each printing unit includes two or more printing stations 21 (or 35) arranged along the transport direction X.

(3) Each of foregoing Embodiments 1-3 has been described taking for example a printing mode for printing one image on one surface of the web paper WP. This invention is not limited to such a printing mode only. For example, this invention is applicable also to a case of printing different images in a plurality of lanes formed by dividing the web paper WP in the width direction Y thereof. Reference is made to FIGS. 7A and 7B. FIGS. 7A and 7B are schematic views illustrating a case of setting a plurality of lanes, in which FIG. 7A shows a front surface, and FIG. 7B shows a back surface.

In this printing mode, for example, two print areas are set in the width direction Y of the web paper WP, which are made lanes LN1 and LN2. Different front surface images A1-A3 and B1-B5 are printed in the lanes LN1 and LN2 on the front surface. On the back surface also, different back surface images C1-C3 and D1-D5 are printed in the lanes LN1 and LN2. The case of the lanes LN1 and LN2 set in this way also produces the same effects as foregoing Embodiments 1-3 by creating and printing the back surface printing image data in each of the lanes LN1 and LN2. This invention is similarly applicable to a case of three or more lanes.

(4) Each of foregoing Embodiments 1-3 has been described taking the inkjet printing apparatus 1 (1A or 1B), for example. This invention is applicable also to printing apparatus other than the inkjet type.

This invention may be embodied in other specific forms without departing from the spirit or essential attributes thereof and, accordingly, reference should be made to the appended claims, rather than to the foregoing specification, as indicating the scope of the invention.

What is claimed is:

1. A printing apparatus for printing on a front surface of a printing medium, and thereafter printing on a back surface of the printing medium, the apparatus comprising:
    a front surface print head for printing, on the front surface of the printing medium transported in a predetermined transport direction, a cue mark indicating a printing start position in the transport direction of a front surface image, and printing the front surface image based on front surface image data with reference to the cue mark;
    a back surface image data corrector for creating corrected back surface image data by correcting an image size of back surface image data to be formed on the back surface of the printing medium, based on elasticity information obtained beforehand, wherein the elasticity information indicates how much the printing medium expands in the transport direction after printing of the front surface image;
    a detector for detecting the cue mark printed on the front surface of the printing medium;
    a back surface print head for printing a back surface image based on the corrected back surface image data on the back surface of the printing medium with reference to the cue mark detected by the detector; and
    a printing control unit for controlling the front surface print head, the back surface image data corrector, the detector, and the back surface print head to print images on both surfaces of the printing medium,
    wherein the printing control unit comprises:
        a page interval calculator for calculating as the elasticity information a page interval in the transport direction between the cue marks detected by the detector;
        a cut limiting value memory for storing beforehand:
            (1) a first limiting value indicating, when an image printed based on the corrected back surface image data exceeds the cue mark of an upstream side in the transport direction, a length from the cue mark to an edge of the image, wherein the edge of the image is present outside the page interval, and
            (2) a second limiting value indicating, when an image printed based on the corrected back surface image data does not reach the cue mark of the upstream side in the transport direction, a length from the cue mark to the edge of the image, wherein the edge of the image is present within the page interval,
        a cut amount arithmetic processor for calculating a difference between (1) the page interval and (2) a transport-direction length of an image printed based on the corrected back surface image data; and
        an error checker for determining that an error has occurred when the difference exceeds the first or second limiting value.

2. The printing apparatus according to claim 1, further comprising an elasticity information memory for storing the elasticity information beforehand;
    wherein the back surface image data corrector changes the image size of the back surface image data in the transport direction using the elasticity information.

3. The printing apparatus according to claim 2, wherein:
    the front surface print head, when a plurality of print areas are set as lanes in a width direction perpendicular to the transport direction, prints the front surface image based on the front surface printing image data in each of the lanes;
    the back surface image data corrector creates the corrected back surface image data for each of the lanes; and
    the back surface print head prints the back surface image based on the back surface printing image data for each of the lanes.

4. The printing apparatus according to claim 3, further comprising transport rollers for transporting the printing medium, and an image layout processor for setting a print area for printing the back surface image on the back surface of the printing medium based on the elasticity information;
    wherein the back surface print head starts printing based on the corrected back surface image data when, after the detector detects the cue mark, the transport rollers have transported the printing medium a distance corresponding to the interval between the printing start position for the back surface print head and a position for detecting the cue mark by the detector, and stops the printing based on the corrected back surface image data when the transport rollers have further transported the printing medium just a length corresponding to the print area.

5. The printing apparatus according to claim 2, further comprising transport rollers for transporting the printing medium, and an image layout processor for setting a print area for printing the back surface image on the back surface of the printing medium based on the elasticity information;
wherein the back surface print head starts printing based on the corrected back surface image data when, after the detector detects the cue mark, the transport rollers have transported the printing medium a distance corresponding to the interval between the printing start position for the back surface print head and a position for detecting the cue mark by the detector, and stops the printing based on the corrected back surface image data when the transport rollers have further transported the printing medium just a length corresponding to the print area.

6. The printing apparatus according to claim 1, further comprising an alarm for notifying the error when the error checker determines an occurrence of the error.

7. The printing apparatus according to claim 6, wherein:
the front surface print head, when a plurality of print areas are set as lanes in a width direction perpendicular to the transport direction, prints the front surface image based on the front surface printing image data in each of the lanes;
the back surface image data corrector creates the corrected back surface image data for each of the lanes; and
the back surface print head prints the back surface image based on the back surface printing image data for each of the lanes.

8. The printing apparatus according to claim 7, further comprising transport rollers for transporting the printing medium, and an image layout processor for setting a print area for printing the back surface image on the back surface of the printing medium based on the elasticity information;
wherein the back surface print head starts printing based on the corrected back surface image data when, after the detector detects the cue mark, the transport rollers have transported the printing medium a distance corresponding to the interval between the printing start position for the back surface print head and a position for detecting the cue mark by the detector, and stops the printing based on the corrected back surface image data when the transport rollers have further transported the printing medium just a length corresponding to the print area.

9. The printing apparatus according to claim 6, further comprising transport rollers for transporting the printing medium, and an image layout processor for setting a print area for printing the back surface image on the back surface of the printing medium based on the elasticity information;
wherein the back surface print head starts printing based on the corrected back surface image data when, after the detector detects the cue mark, the transport rollers have transported the printing medium a distance corresponding to the interval between the printing start position for the back surface print head and a position for detecting the cue mark by the detector, and stops the printing based on the corrected back surface image data when the transport rollers have further transported the printing medium just a length corresponding to the print area.

10. The printing apparatus according to claim 1, wherein:
the front surface print head, when a plurality of print areas are set as lanes in a width direction perpendicular to the transport direction, prints the front surface image based on the front surface printing image data in each of the lanes;
the back surface image data corrector creates the corrected back surface image data for each of the lanes; and
the back surface print head prints the back surface image based on the back surface printing image data for each of the lanes.

11. The printing apparatus according to claim 10, further comprising transport rollers for transporting the printing medium, and an image layout processor for setting a print area for printing the back surface image on the back surface of the printing medium based on the elasticity information;
wherein the back surface print head starts printing based on the corrected back surface image data when, after the detector detects the cue mark, the transport rollers have transported the printing medium a distance corresponding to the interval between the printing start position for the back surface print head and a position for detecting the cue mark by the detector, and stops the printing based on the corrected back surface image data when the transport rollers have further transported the printing medium just a length corresponding to the print area.

12. The printing apparatus according to claim 1, further comprising transport rollers for transporting the printing medium, and an image layout processor for setting a print area for printing the back surface image on the back surface of the printing medium based on the elasticity information;
wherein the back surface print head starts printing based on the corrected back surface image data when, after the detector detects the cue mark, the transport rollers have transported the printing medium a distance corresponding to the interval between the printing start position for the back surface print head and a position for detecting the cue mark by the detector, and stops the printing based on the corrected back surface image data when the transport rollers have further transported the printing medium just a length corresponding to the print area.

13. The printing apparatus according to claim 1, wherein the elasticity information is updated based on a difference between a length of the back surface image of the corrected black surface image data and a length of the front surface image. further transported the printing medium just a length corresponding to the print area.

* * * * *